United States Patent Office 2,745,099
Patented May 8, 1956

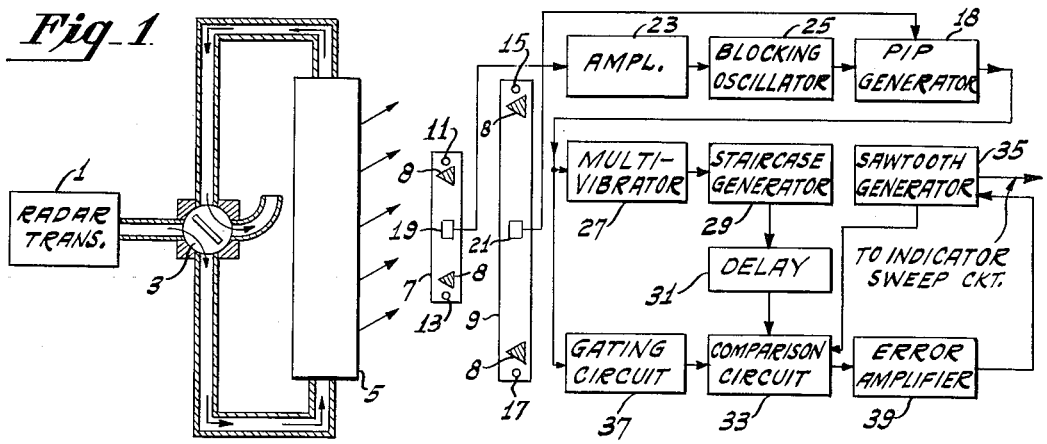
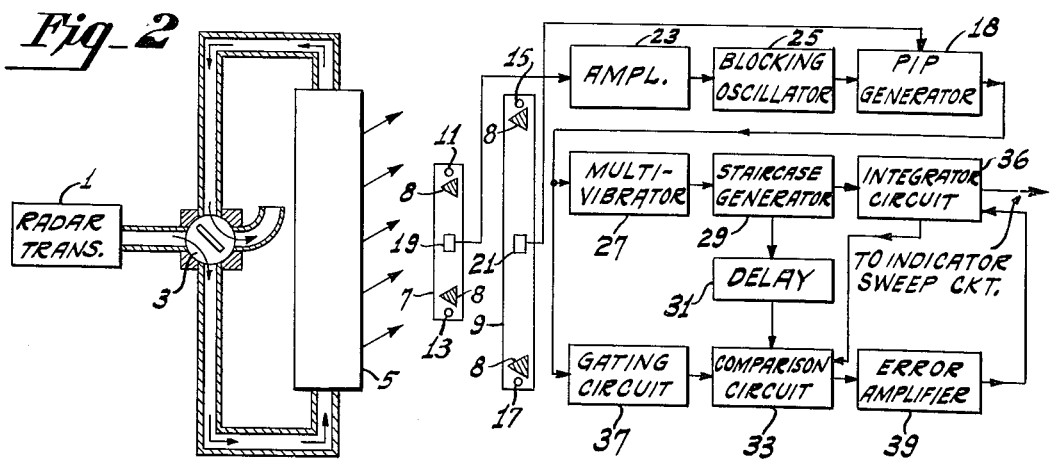
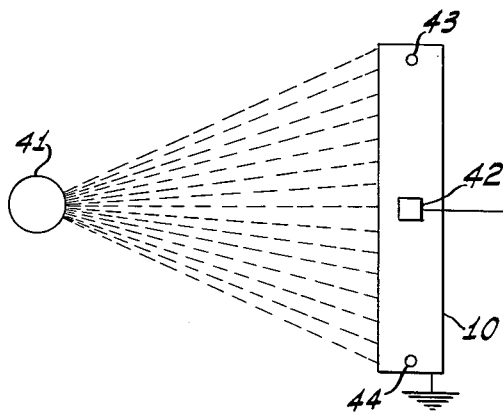

2,745,099

SWEEP MODULATOR DIRECTION FINDER

Waldon P. Bollinger and Richard W. Howery, Haddonfield, N. J., and John R. Ford, Narberth, Pa., assignors, by mesne assignments, to the United States of America as represented by the Secretary of the Air Force Application May 10, 1951, Serial No. 225,568

15 Claims. (Cl. 343—113)

This invention relates generally to radar systems and more particularly to an improved device and electronic circuit for improving the accuracy of a wide angle radar scanner.

In many radar systems, and particularly in aircraft ground control of approach systems, target locating accuracy generally must be extremely good. A linear scanning array such as the Eagle scanner antenna (AN/APQ-7) is relatively simple in theory and in structure but it does not, per se, attain the high accuracy generally required for GCA systems.

The Eagle antenna comprises a rectangular hollowpipe variable width waveguide feeding a linear dipole array of the order of 250 dipoles. By a switching arrangement radio frequency energy is alternately bi-laterally coupled through the rectangular guide to the dipole array. Simultaneously, varying the waveguide width, by means of a crank and toggle device, causes the energy thus fed to the dipoles to be shifted in phase according to the instantaneous width of the waveguide. The resulting radiation pattern from the dipole array is a long narrow fan-shaped beam of energy which beam is caused to scan approximately thirty degrees to either side of a selected axis. A more detailed description of the Eagle scanner may be obtained with reference to vol. 26, pp. 185–193 of the M. I. T. Radiation Laboratory Series.

Inaccuracy, in the scanning system utilizing the Eagle antenna occurs because the scanning rate of its antenna pattern is not a constant angular function; while the indicator tube sweep, generated in the radar receiver, is substantially linear. The combination of the two, the non-linear antenna scan and the linear indicator sweep, does not provide a true time displacement indication for received target echoes. The most feasible solution to the problem is to provide an indicator sweep that is controlled by the scanning rate of the radio-frequency beam. Mechanical controls such as a specially constructed capacitor, the voltage of which is a function of the variation in the waveguide width, are generally unsatisfactory because of temperature change problems and mechanical errors.

The present invention obviates these difficulties by providing an electronic circuit for controlling the receiver indicator sweep.

It is an object of the instant invention to provide an improved wide angle radar scanning system.

Another object of the invention is to improve the accuracy of a wide angle radar scanning system.

Another object of the invention is to provide an electronic means for improving the accuracy of a wide angle radar scanner.

A further object of the invention is to improve the accuracy of a linear wide angle radar scanning system by modulating the receiver indicator sweep signal thereof.

According to a typical embodiment of the invention, a plurality of waveguide members, each having a pair of apertures oppositely disposed in a given member wall, are disposed within the field of and in close proximity to an Eagle scanner antenna. The apertured members face the Eagle antenna dipole array and sample a part of the energy radiated therefrom. Pulses of energy derived from this wave sampling device subsequently generate a staircase shaped wave which wave shape depends upon the rate at which the Eagle antenna scanning pattern is searching a selected region. The staircase wave and a sawtooth timing wave, which sawtooth is normally applied to the radar receiver indicator sweep circuit, are periodically compared in a signal comparison circuit and an error signal derived therein. The error signal thus obtained is applied to and alters the charging rate of a relaxation oscillator producing the sawtooth signal such that the corrected sawtooth sweep signal applied to the receiver indicator is a function of the angular rate at which the Eagle antenna radiation pattern is scanning.

A second embodiment of the invention utilizes an integrator circuit, which integrates the generated staircase wave and then periodically compares the integrated wave with the original staircase wave. The error signal obtained from this comparison arrangement is applied to the integrator circuit altering the charging rate thereof. Thus the receiver indicator sweep is again modulated in accordance with the scanning rate of the radar antenna scanning field pattern.

A third embodiment, according to the invention, discloses a single energy sampling member, according to the invention, used in a system for determining the bearing of a remote wave reflecting object or remote transmitter.

The invention will be described in greater detail with reference to the accompanying drawing in which Figure 1 is a schematic block diagram of a radar receiver indicator sweep modulator, according to the invention, in which a sawtooth sweep signal, generated by a relaxation oscillator, is compared with a staircase wave signal; Figure 2 is a schematic block diagram of radar receiver indicator sweep modulator according to the invention, in which an integrated staircase wave signal is compared with a delayed staircase wave signal; and Figure 3 is a schematic block diagram including a wave sampling member, according to the invention, as used in a direction finding system.

Similar reference characters are applied to similar elements throughout the drawing.

Referring to Figure 1 of the drawing, radio-frequency energy is coupled from a pulse radar transmitter 1 through a switching device 3 to a wide angle radar scanner 5, for example, the Eagle scanner (AN/APQ-7). Mechanical operation of movable component parts of the Eagle scanner 5 coordinated with the operation of switch 3 causes a radio-frequency beam of energy radiated from the Eagle scanner to volumetrically scan a region approximately thirty degrees to either side of straight ahead, thus producing a total antenna scan of the order of sixty degrees. Since the radiation pattern of the Eagle antenna scans the preselected region at a non-linear rate, it is preferable, in order to improve target locating accuracy, to modulate the sweep signal applied to the radar receiver indicator tube in accordance with this non-linear scanning function.

According to the invention and referring to Figure 1, a plurality of rectangular hollowpipe waveguide wave sampling members, say two, 7, 9 are disposed within the field of the Eagle antenna 5 and are generally located on the order of two or three inches from the antenna structure. One of the wave members 7 is relatively short while the second member 9 may be approximately the length of the Eagle scanning array 5. In practice the two sampling members 7, 9 are preferably "butted" together to form a more compact mechanical arrangement. Each wave sampling member 7 and 9 includes pairs of apertures 11, 13 and 15, 17, respectively, oppositely disposed in the waveguide wall exposed to the radio frequency scanning beam.

As the radio-frequency beam is caused to scan, the longer wave sampling member 9 passes a number of beats, the number of beats passed depending upon the distance between its two apertures 15, 17 in wavelengths and the angular displacement of the scanning beam. A detector 21, longitudinally offset one-quarter wavelength from a mid-position between the sampling apertures 15, 17 registers a null each time traveling waves of radio-frequency energy sampled by oppositely disposed apertures 15, 17 are in phase with each other. These nulls are then coupled to a pip generator 18. The detector 21, in the longer wave sampling member 9, may register more than a hundred nulls per one sixty degree antenna scan. This large number of nulls subsequently greatly enhances the accuracy of the radar system.

Simultaneously, the shorter wave sampling member 7, through a pair of sampling apertures 11, 13, also samples radio-frequency energy as the beam scans and passes a number of beats. The shorter length of this member 7 enables fewer nulls to be detected by a detector 19, which also is longitudinally offset one-quarter wave-length from a mid-position between its oppositely disposed sampling apertures 11, 13. One of these nulls, which may total approximately five, is selected and when successively coupled to an amplifier 23 and a blocking oscillator 25, gates the pip generator 18 for the period of one scan of the Eagle scanner 5. The null selected is preferably that which indicates the straight ahead position of the R. F. energy beam. Two attenuators, 8, 8 are preferably disposed with each waveguide member 7 and 9 to reduce the signal strength of the sampled transmitted energy traveling therein.

The pip generator 18 thus gated produces in its output a large plurality of pips, each successive pip being displaced from that which immediately precedes it by the time period between appropriate successive nulls registered in wave sampling. Since the nulls registered by the longer sampling member 9 are proportional to the angular position of the antenna radiation pattern, the output derived from the pip generator 18 effectively measures the position of the scanning beam.

The pip generator output triggers a multivibrator 27 which produces an output signal therefrom for each applied input signal. The substantially square wave multivibrator output signals generate a staircase threshold signal similar to that which is described in vol. 19, pages 603–604 of the M. I. T. Radiation Laboratory Series. The output from the staircase generator 29 is delayed in a time delay network 31 and thence coupled to a signal comparison circuit 33.

A relaxation oscillator of a sawtooth generator 35 normally produces a substantially linear sawtooth wave signal. The sawtooth generator output, however, is also coupled to the signal comparison circuit 33.

Coincident with the triggering of the multivibrator 27 by the pip generator output, the pips also trigger a gating circuit 37 which periodically gates the signal comparison circuit 33 to which the staircase and sawtooth wave signals are applied. This gating of the comparison circuit 33 enables an error signal to be derived therefrom which is amplified in an error amplifier 39 and then applied to a control electrode of the sawtooth generator 35 altering the charging rate of the relaxation oscillator. Thus the sawtooth signal output from the generator 35 is modified in accordance with the sweep rate of the radio-frequency antenna radiation pattern. The modified sweep signal is then coupled to the sweep circuits of a receiver indicator viewing tube (not shown) to provide an accurate time base for received target echoes. The time delay network 31 which delays the output of the staircase generator 29 functions merely to avoid comparing the staircase and sawtooth waves during the sharp rise time of the staircase wave and thus produce an indicator sweep corresponding more closely to the R. F. antenna radiation pattern scanning rate. Means, not shown, are provided to restore the staircase generator when the blocking oscillator 25 is not energized.

In a second embodiment, according to the invention and with reference to Fig. 2, the output from the pip generator 18, again triggers a multivibrator 27 which actuates a staircase generator 29. The staircase generator output is delayed in a time delay network 31 and applied to a signal comparison circuit 33. Thus far the circuit operation is identical to that of the circuit of Fig. 1. The staircase generator output, however, is also coupled to an integrator circuit 36 which integrates the staircase wave and produces a non-linear sawtooth wave which wave shape non-linearity approximates the non-linearity of the Eagle antenna scanning rate. The integrated staircase wave is also applied to the signal comparison circuit 33 and, when gated by the pip generator signals, an error signal is derived. The error signal is amplified in an error amplifier 39, changes the charging rate of the integrator circuit 36, and further improves the accuracy of the receiver indicator sweep signal.

Referring to Fig. 3 of the drawing, high-frequency energy transmitted, retransmitted, or reflected by a remote station 41 enters and is propagated within a pivotal apertured rectangular hollowpipe waveguide 10. The waveguide 10 is similar to the guides 7, 9 employed in the circuits of Figs. 1 and 2, except that the received energy here sampled is not of sufficient strength to justify its attenuation. A phase-sensitive null detector 42 is longitudinally disposed one-quarter wavelength off a mid-position between a pair of apertures 43, 44 oppositely situated in a given wall of the waveguide member 10.

When the azimuth position of the rotatable direction finding member is properly adjusted, the high frequency energy directed from the remote station to the sampling apertures 43, 44 travel individual paths of substantially equal lengths and the energy received at one aperture 43 is in phase with the energy received at the oppositely situated aperture 44. The traveling wave energy thus introduced into the direction finding member 10 registers a null since the energy components reach the null detector 42 differing in phase by 180°. The null developed is amplified in a suitably biased amplifier 45 and then is applied to a null indicator 47 to provide a visual indication of the resolution of the bearing of the remote station 41. The resolved station bearing then lies along a line midway between the sampling apertures 43, 44 which line is normal to the direction finding member wall containing the apertures.

Thus it is seen, referring again to Figs. 1 and 2, that the sweep modulating system herein disclosed resolves inaccuracies inherent in some wide angle scanners. The relatively long wave sampling member 9 provides a large number of nulls subsequently utilized in greatly improving the accuracy of the scanner. The shorter sampling member 7, by developing fewer nulls, gates the receiver indicator sweep correction signals and hence reduces backlash and other mechanical errors existing in the antenna. The third embodiment, Fig. 3, disclosed teaches the application of a wave sampling member 10, according to the invention, applied to remote object direction locating. This arrangement provides improved accuracy by utilizing a phase-sensitive null detector 42 and the relatively long apertured direction finding member 10. While the plurality of detectors in the various embodiments are disclosed as being located a quarter wavelength, at the operating frequency, longitudinally offset from a mid-position between appropriate oppositely disposed apertures, it may be preferable to place the detectors exactly midway between said apertures and reverse the coupling to one side of each detector. In this way a null may also suitably be registered when the signal energies at the sampling apertures are in phase.

What is claimed is:

1. A system for modulating a substantially linear sweep generator in accordance with a predetermined rate function comprising a linear antenna array for scanning a selected region, said antenna array scanning said region at a non-linear angular rate, an energy sampling member responsive to said scanning, means coupled to said member for generating a plurality of signals proportional to said non-linear angular scanning rate to provide control signals, and means for utilizing said control signals to correlate said sweep with said non-linear angular rate.

2. A system for modulating a substantially linear sweep generator in accordance with a predetermined rate function comprising a linear antenna array for volumetrically scanning a selected region, said antenna array scanning said region at a non-linear angular rate, an apertured hollow-pipe waveguide energy sampling member responsive to said scanning, means coupled to said member for generating a plurality of signals proportional to said non-linear angular scanning rate to provide control signals, and means for utilizing said control signals to correlate said sweep with said non-linear angular rate.

3. A system as claimed in claim 2 wherein a detector is disposed within said hollowpipe waveguide member, said detector being located one-quarter wavelength longitudinally offset from a mid-position between a pair of longitudinally oppositely disposed apertures in a selected wall of said waveguide energy sampling member.

4. A system for modulating a substantially linear sweep generator in accordance with a predetermined rate function comprising a linear antenna array for volumetrically scanning a selected region, said antenna array scanning said region at a non-linear angular rate, a plurality of apertured hollowpipe waveguide energy sampling members responsive to said scanning and means coupled to said energy sampling members for generating a plurality of signals proportional to said non-linear angular scanning rate to provide control signals, and means for utilizing said control signals to correlate said sweep with said non-linear angular rate.

5. A system as claimed in claim 4 wherein said plurality of hollowpipe waveguide energy sampling members each include a pair of longitudinally oppositely disposed energy sampling apertures and a detector in each of said waveguide members, said detector being longitudinally offset one-quarter wave from a mid-position between said pair of apertures.

6. A system for modulating a substantially linear sweep generator in accordance with a predetermined rate function comprising a linear antenna array for scanning a selected region, said antenna array scanning said region at a non-linear angular rate, a plurality of apertured hollow-pipe waveguide energy sampling members responsive to said scanning each of said members enclosing a phase-sensitive null detector for producing output signals proportional to said non-linear scanning rate, a pip generator gated by said detector outputs, and means actuated by output signals from said pip generator for generating a staircase wave signal proportional to said non-linear scanning rate.

7. A system as claimed in claim 6 wherein said detector output for gating said pip generator is successively coupled to a signal rectifier circuit, a blocking oscillator, and said pip generator.

8. A system as claimed in claim 6 wherein said means actuated by output signals from said pip generator includes a multivibrator and a threshold type staircase wave signal generator.

9. A system as claimed in claim 6 including a substantially linear sawtooth signal generator, means periodically gating a signal comparison circuit for comparing said sawtooth and staircase wave signals, and an error amplifier responsive to said signal comparison, the output of which amplifier periodically alters the charging rate of said sawtooth generator in accordance with said non-linear antenna scanning rate.

10. A system as claimed in claim 9 including a time delay network for suitably delaying said staircase wave signal coupled to said signal comparison circuit.

11. A system as claimed in claim 6 including an integrator circuit for integrating said staircase wave signal, means periodically gating a signal comparison circuit for comparing said staircase wave and said integrated staircase wave signals, and an error amplifier responsive to said signal comparison, the output of which amplifier periodically alters the charging rate of said integrator circuit in accordance with said non-linear antenna scanning rate.

12. A system as claimed in claim 11 including a time delay network for suitably delaying said staircase wave signal coupled to said signal comparison circuit.

13. A remote station direction finding system comprising a pivotal hollowpipe waveguide including in a given waveguide wall a pair of longitudinally oppositely disposed apertures, said waveguide enclosing a phase-sensitive null detector, said detector registering a null when signal energies transmitted or reflected from a remote station travel equidistant paths from said station to each of said apertures.

14. A system as claimed in claim 13 wherein said null indication registered is amplified in an amplifier and applied to an indicating device for indicating the resolved bearing of said remote station.

15. A remote station direction finding system comprising a pivotal hollowpipe waveguide including in a given waveguide wall a pair of longitudinally oppositely disposed apertures, a phase-sensitive null detector, said waveguide enclosing means for coupling to said phase-sensitive detector, said detector registering a null when signal energies transmitted or reflected from a remote station travel equidistant paths from said station to each of said apertures.

References Cited in the file of this patent

UNITED STATES PATENTS

| | | |
|---|---|---|
| 2,074,033 | Tolson | Mar. 16, 1937 |
| 2,085,409 | Bedford | June 29, 1937 |
| 2,420,303 | De France | May 13, 1947 |
| 2,426,217 | Hoisington | Aug. 26, 1947 |
| 2,440,261 | Ginzton | Apr. 27, 1948 |
| 2,455,673 | Hansell | Dec. 7, 1948 |
| 2,476,441 | Doherty | July 19, 1949 |
| 2,540,839 | Southworth | Feb. 6, 1951 |
| 2,541,454 | White et al. | Feb. 13, 1951 |
| 2,587,313 | Grundmann | Feb. 26, 1952 |